United States Patent [19]
Wicks

[11] Patent Number: 6,081,693
[45] Date of Patent: Jun. 27, 2000

[54] TELEVISION AND RADIO INFORMATION PAGER

[75] Inventor: James E. Wicks, San Francisco, Calif.

[73] Assignees: Sony Corporation, Tokyo, Japan; Sony Electronics, Inc., Park Ridge, N.J.

[21] Appl. No.: 08/795,128

[22] Filed: Feb. 7, 1997

[51] Int. Cl.[7] .............................. H04Q 7/08; H04Q 7/12
[52] U.S. Cl. .................. 455/31.3; 455/31.2; 455/421; 375/222
[58] Field of Search ........................... 455/419, 420, 455/31.2, 31.3, 421; 375/222; 340/825.44, 825.69, 825.25, 311.1; 348/12, 13.7

[56] References Cited

U.S. PATENT DOCUMENTS

| | | |
|---|---|---|
| 4,415,065 | 11/1983 | Sandstedt . |
| 4,718,112 | 1/1988 | Shinoda ............................. 455/151.4 |
| 4,951,039 | 8/1990 | Schwendeman et al. . |
| 5,086,394 | 2/1992 | Shapira ............................ 340/407.2 |
| 5,173,688 | 12/1992 | DeLuca et al. . |
| 5,331,431 | 7/1994 | Jasinski . |
| 5,446,678 | 8/1995 | Saltzstein et al. . |
| 5,452,356 | 9/1995 | Albert . |
| 5,467,197 | 11/1995 | Hoff ................................. 386/83 |
| 5,481,255 | 1/1996 | Albert et al. . |
| 5,491,785 | 2/1996 | Robson et al. . |
| 5,495,344 | 2/1996 | Callaway, Jr. et al. . |
| 5,508,695 | 4/1996 | Nelson et al. ..................... 340/825.37 |
| 5,535,428 | 7/1996 | King et al. . |
| 5,542,115 | 7/1996 | Wong et al. ........................... 455/31.3 |
| 5,550,861 | 8/1996 | Chan et al. ............................ 375/222 |
| 5,552,779 | 9/1996 | Gaskill et al. ...................... 340/825.44 |
| 5,631,635 | 5/1997 | Robertson et al. ............... 340/825.47 |

*Primary Examiner*—Dwayne D. Bost
*Assistant Examiner*—Alan T. Gantt
*Attorney, Agent, or Firm*—Ronald P. Kananen; Rader, Fishman & Grauer

[57] ABSTRACT

A pager and two-way paging system may be provided which allow the pager user to send a request for television and/or radio programming information. The system compiles television and/or radio programming information which will be of interest to the user, based on a profile of the user's interests filed with the service provider. In a one-way paging system, the service provider makes periodic transmissions of timely programming information of interest to the pager user. In a two-way paging system, the service provider transmits the compiled information when a request is received from the user. The user may also select a program from the information transmitted and instruct the service provider to purchase the program, if pay-per-view, or have the program recorded by the user's VCR.

10 Claims, 5 Drawing Sheets

– 6,081,693 –

TELEVISION AND RADIO INFORMATION PAGER

FIELD OF THE INVENTION

The present invention relates generally to the field of wireless pagers. More particularly, the present invention relates to the application of wireless pager technology to television and radio programming.

BACKGROUND OF THE INVENTION

Portable radio receivers and transceivers, such as wireless pagers, have become increasingly popular as a means of communication. Pagers are typically carried by users who wish or need to receive communications when they are away from a telephone or computer, or are unable to predict where they may be reached at a given time.

In general, the user of a pager purchases the unit and enters into a contact with a service provider. As shown in FIG. 1, when someone 12 wishes to page a particular user, they contact the user's service provider 11, identify the user to be paged (perhaps with a personal identification number), and may give a message to the service provider 11 that is to be broadcast to the user's pager 15.

The service provider 11 maintains a network of radio transceiver base stations 13, 14 which are spread throughout the service area covered by the service provider. The transmitting base stations 13 are distributed so that transmissions from at least one base station can be received by a pager 15 anywhere in the service area.

In a simplistic system, when the service provider 11 receives a request to page a user 15, the page is broadcast by all the base stations 13 in the system. Thus, if the pager 15 is located anywhere in the service area, it will receive the page. The pager 15 will then alert the user that a page has been received with, for example, an audible or vibratory alert signal.

In a more sophisticated system, the pager 15 may have the capability to not only receive a transmission from the service provider's system, but may have the capability to transmit an answer back to the system. This is referred to as two-way paging.

Because the strength of a transmission from a pager 15 is tightly constrained by the battery power available to the pager, a two-way paging system must include a greater number of receiving base stations 14 than transmitting base stations 13. The receiving base stations 14 are smaller and distributed more widely that transmitting base stations 13 in order to receive the relatively weak transmissions broadcast by individual pagers 15. The receiving base stations 14 must be sufficient in number and distribution to receive pager transmissions originating anywhere in the service area.

With these advances, the usefulness of pagers as a means of communication has expanded rapidly. Service providers have encouraged this expansion by experimenting with pagers as a means to disseminate information of interest to pager users. For example, as described in U.S. Pat. No. 5,508,695 to Nelson et al., incorporated herein by reference, a one-way pager system is used to relay sports or financial information to a pager user who has contracted with the service provider for that service.

However, there are many potential, undiscovered applications of pager technology which may provide pager users with, as yet unheard of, abilities to communicate and manage information. This is particularly true of the developing two-way pager systems. Accordingly, there is a need for improved methods and applications of pager technology to meet the information and communication demands of pager users.

Television and radio programming are also extremely popular in modern society. Most people have weekly or daily series they are interested in viewing or hearing. Television and radio also provide access to sporting and other events. The modern advent of cable television and pay-per-view systems have expanded even further the range of available television programming.

In light of this almost overwhelming abundance of entertainment and information options, keeping track of programming which a viewer wishes to see can be difficult and time-consuming. Accordingly, there is a need for an improved method and means of selecting and tracking television and radio programming in which one is interested.

SUMMARY OF THE INVENTION

It is an object of the present invention to meet the above identified needs and others. Particularly, it is an object of the present invention to provide a pager technology in which a pager user can use a pager to receive information and about television and/or radio programming in which the pager user is interested.

It is a further object of this invention to provide a pager technology which can query a service provider for television and radio programming information, and which can be used to assist the pager user in recording programming or arranging for pay-per-view programming.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve the stated and other objects of the present invention, as embodied and described below, the invention may include a pager comprising: a display; means for transmitting a request for television or radio programming information to a paging system; and means for receiving television or radio programming information transmitted by the paging system.

The television programming information may comprise time, channel, or pay-per-view information. The means for transmitting a request may comprise: an icon displayed on the display; and means for selecting the icon. The request is transmitted in response to the selection of the icon.

The present invention may also comprise a paging system comprising: at least one radio signal receiving base station for receiving radio signals from the pager; at least one radio signal transmitting base station for transmitting radio signals to the pager; means for identifying the request for television or radio programming information transmitted by the pager; means for compiling the television or radio programming information; and means for transmitting the television or radio information to the pager.

The paging system may further comprise a profile of the interests of a pager user. The means for compiling television or radio programming information compiles information corresponding to the profile.

The pager of the present invention may also further comprise: means for inputting television program selection information based on the television programming information; and means for transmitting the television program selection information to the paging system.

If the television program selection information comprises a selected pay-per-view program, the paging system may comprise means for purchasing the selected pay-per-view program for a pager user. If the television program selection information comprises a selected program to be recorded, the paging system may comprises mean for arranging for the selected program to be recorded for a pager user.

The means for arranging for the selected program to be recorded for a pager user may comprise a phone or radio modem, accessible by the paging system, through which a video recorder belonging to the pager user may be programmed.

The present invention may also comprise a method of using a pager comprising the steps of: transmitting a request for television or radio programming information to a paging system using a pager; receiving television or radio programming information transmitted by the paging system with the pager; and displaying the information on a display of the pager. The television programming information comprises time, channel, or pay-per-view information.

The step of transmitting a request may comprise the steps of: displaying an icon on the display; and selecting the icon. The request is transmitted in response to the selection of the icon.

The method of the present invention may also comprise the steps of: providing a paging system comprising at least one radio signal receiving base station for receiving radio signals from the pager and at least one radio signal transmitting base station for transmitting radio signals to the pager; identifying the request for television or radio programming information transmitted by the pager with the paging system; compiling the television or radio programming information; and transmitting the television or radio information to the pager.

The method of the present invention may also comprise the steps of: providing the paging system with a profile of the interests of a pager user; and compiling television or radio programming information corresponding to the profile.

The method of the present invention may also comprise the steps of: inputting television program selection information based on the television programming information to the pager; and transmitting the television program selection information to the paging system.

If the television program selection information comprises a selected pay-per-view program, the method may further comprise the step of purchasing the selected pay-per-view program for a pager user. If the television program selection information comprises a selected program to be recorded, the method may further comprise the step of arranging for the selected program to be recorded for a pager user.

Finally, the step of arranging for the selected program to be recorded for a pager user comprises the steps of: providing a phone or radio modem connected to a video recorder belong to the pager user; accessing the modem with the paging system; and programming the video recorder to record the selected program through the modem.

BRIEF DESCRIPTION OF THE DRAWINGS

The accompanying drawings illustrate the present invention and are a part of the specification. Together with the following description, the drawings demonstrate and explain the principles of the present invention. In the drawings.

DETAILED DESCRIPTION OF THE PREFERRED EMBODIMENT

Using the drawings, the preferred embodiment of the present invention will now be explained.

Figure 1:
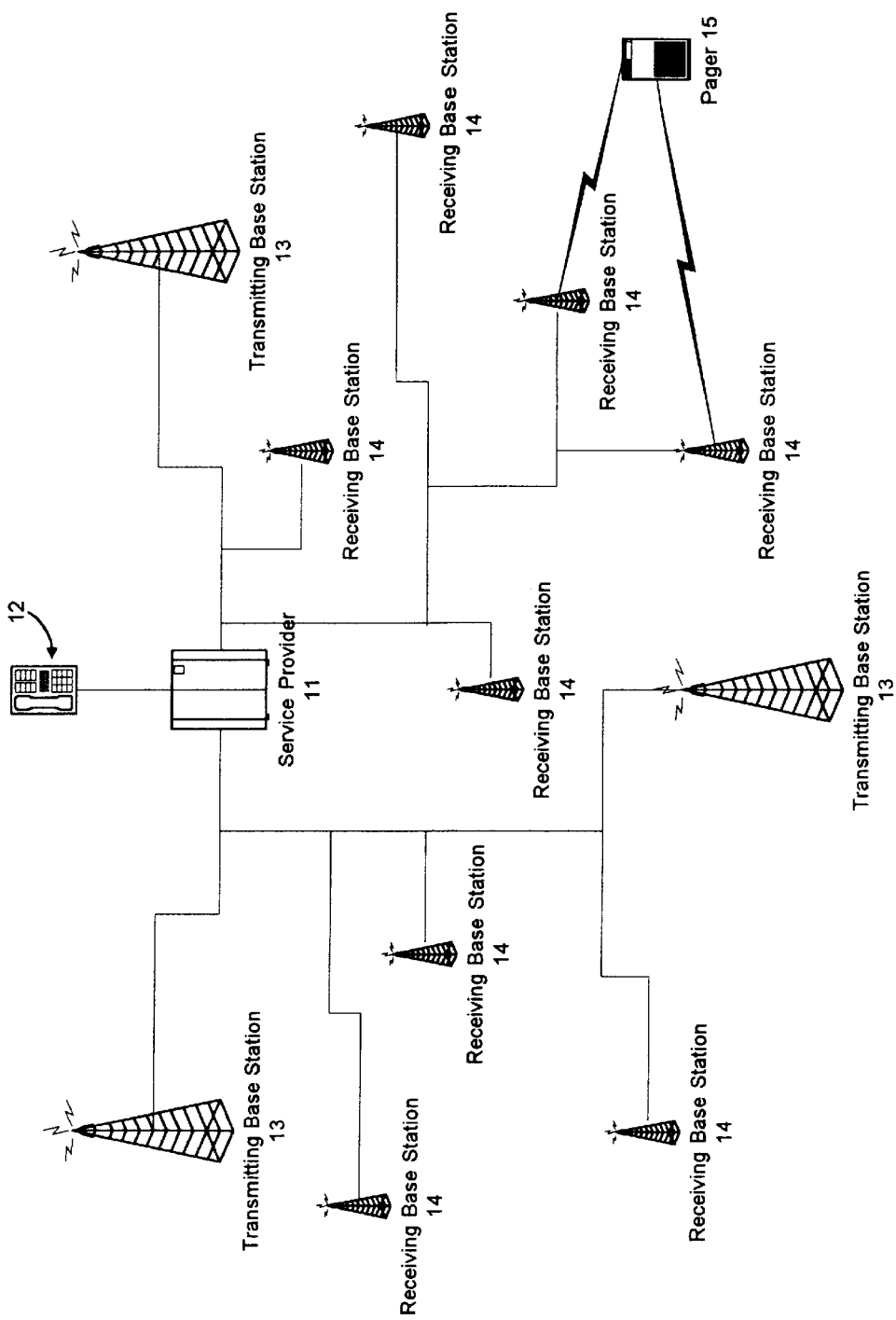
FIG. 1 is a schematic diagram of a conventional two-way paging network with which the present invention may be practiced.
Figure 2:
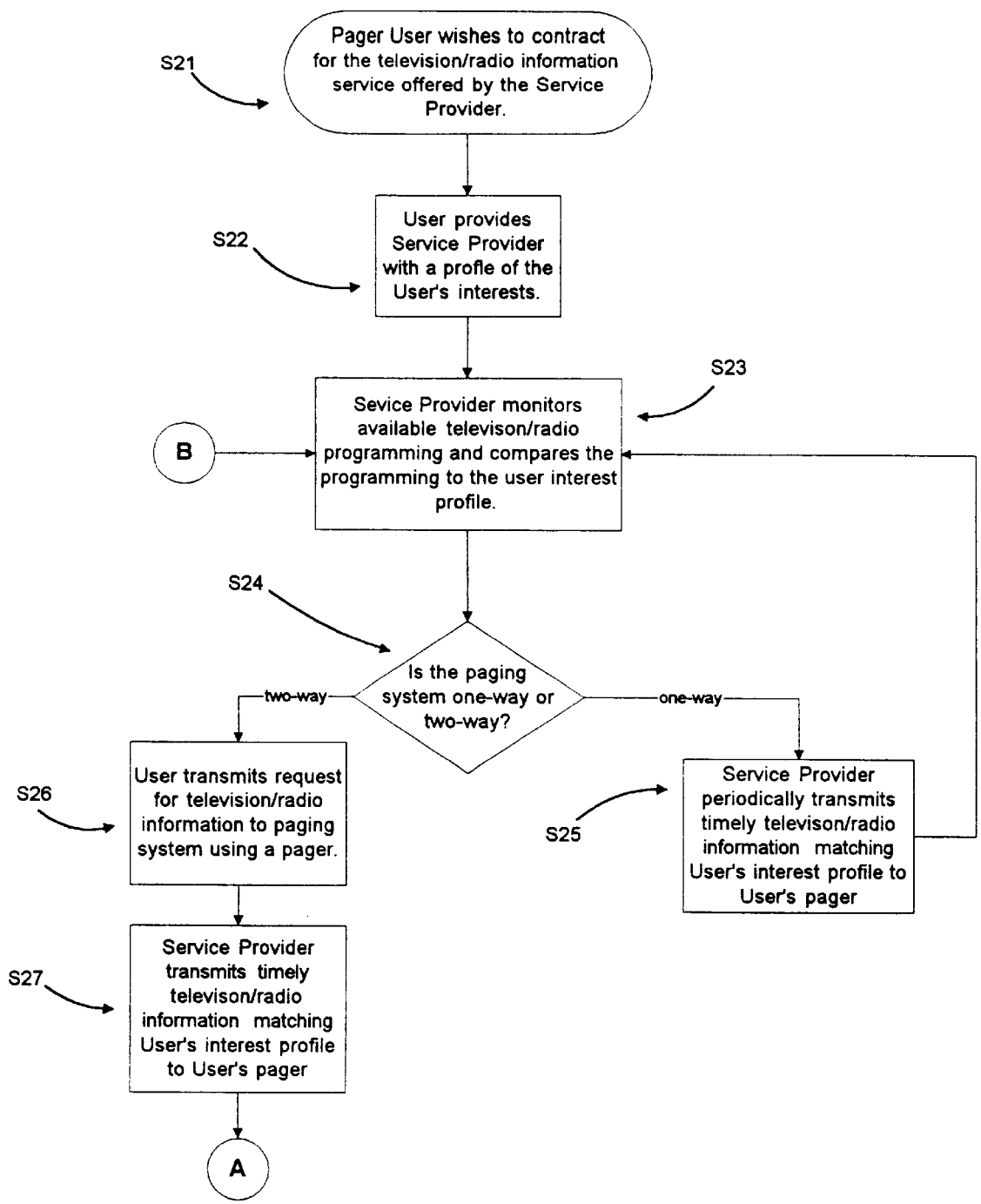
FIG. 2 is a flow chart illustrating some of the principles of the present invention.

The present invention may be implemented, with different features, using either a one-way or two-way paging system. As shown in FIG. 2, according to the principles of the present invention, in step S21, the pager user will subscribe with a service provider for the television/radio information service. In step S22, the user will provide the service provider with a profile that details the particular shows, types of shows, sports teams, etc. in which the user has an interest.

In step S23, the service provider monitors the available television and radio programming and compares that programming to the user's interest profile. This allows the service provider to compile television and radio programming information for transmission to the user in which the user will have an interest.

As demonstrated by step S24, the service provided by the present invention varies depending on whether the paging system employed is one-way to two-way. A shown in step S23, if the paging system is one-way, the service provider periodically transmits the compiled television and radio programming information to the pager user. The information transmitted is sent so as to be timely, giving the pager user sufficient advanced notice before the programming is to be telecast.

Alternatively, a pager on a two-way paging system has the capability to transmit messages to the system. Thus, rather than merely making periodic transmissions of timely programming information as in step S25, in a two-way paging system, no programming information is transmitted to the user until, as in step S26, the user transmits a request to the paging system for the compiled television and/or radio programming information.

Figure 4:
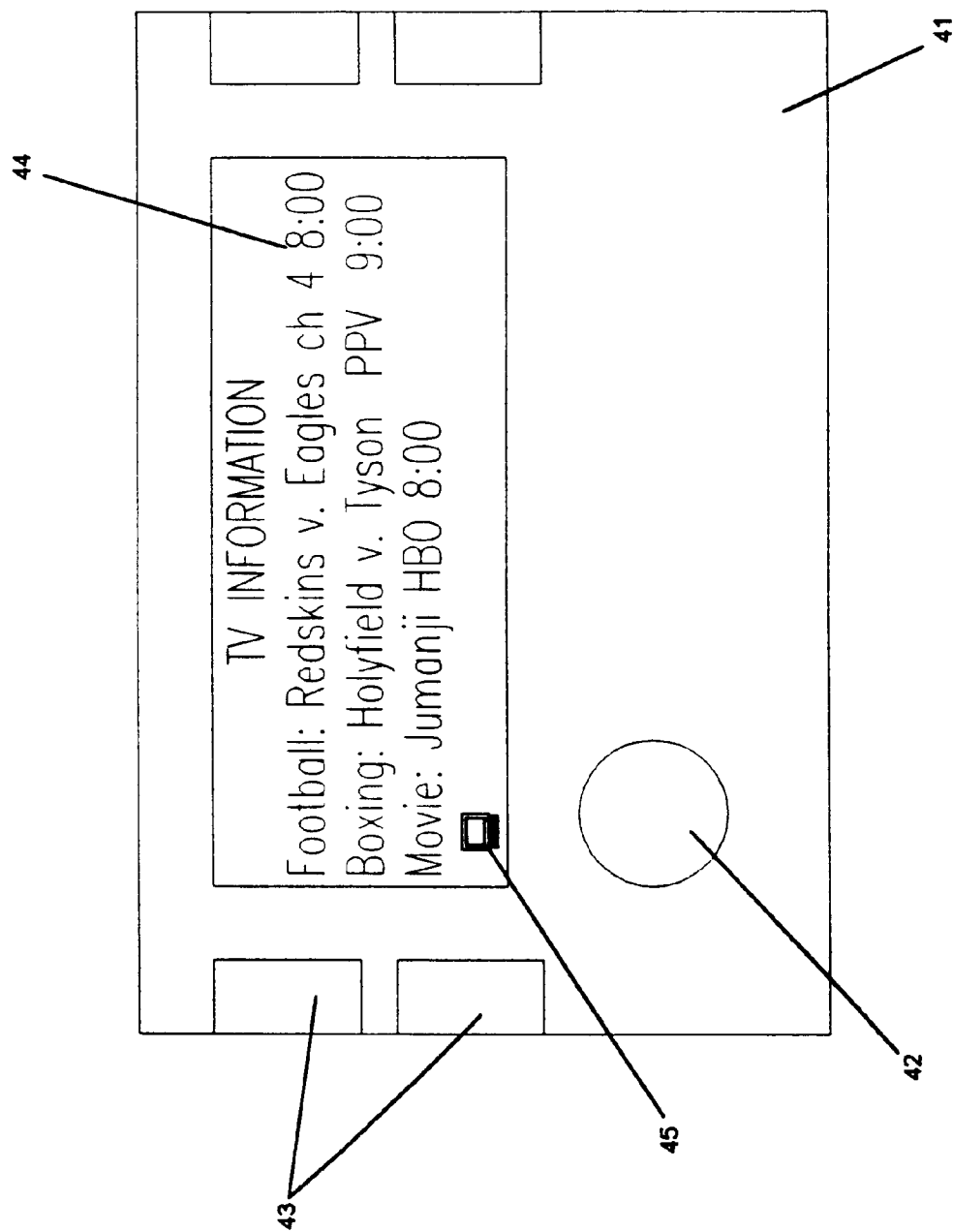
FIG. 4 is a diagram of a pager according to the present invention.

To transmit a request for television and/or radio programming information, the user's pager may have a dedicated button which, when pushed, sends the request. In the preferred embodiment, illustrated in FIG. 4, the user's pager 41 includes a liquid crystal display 44. On the display 44, the user will find an icon 45 which, when selected, sends the request to the service provider for television and/or radio programming information.

To select the icon 45, the pager is provided with buttons 43 for moving a cursor on display 44. When the cursor is highlighting the icon 45, the user pushes the select button 42. The user's pager may be programmed with this feature by the service provider when the contract between the service provider and the pager user is set up and the pager user indicates a desire for the television/radio information service.

Figure 3:
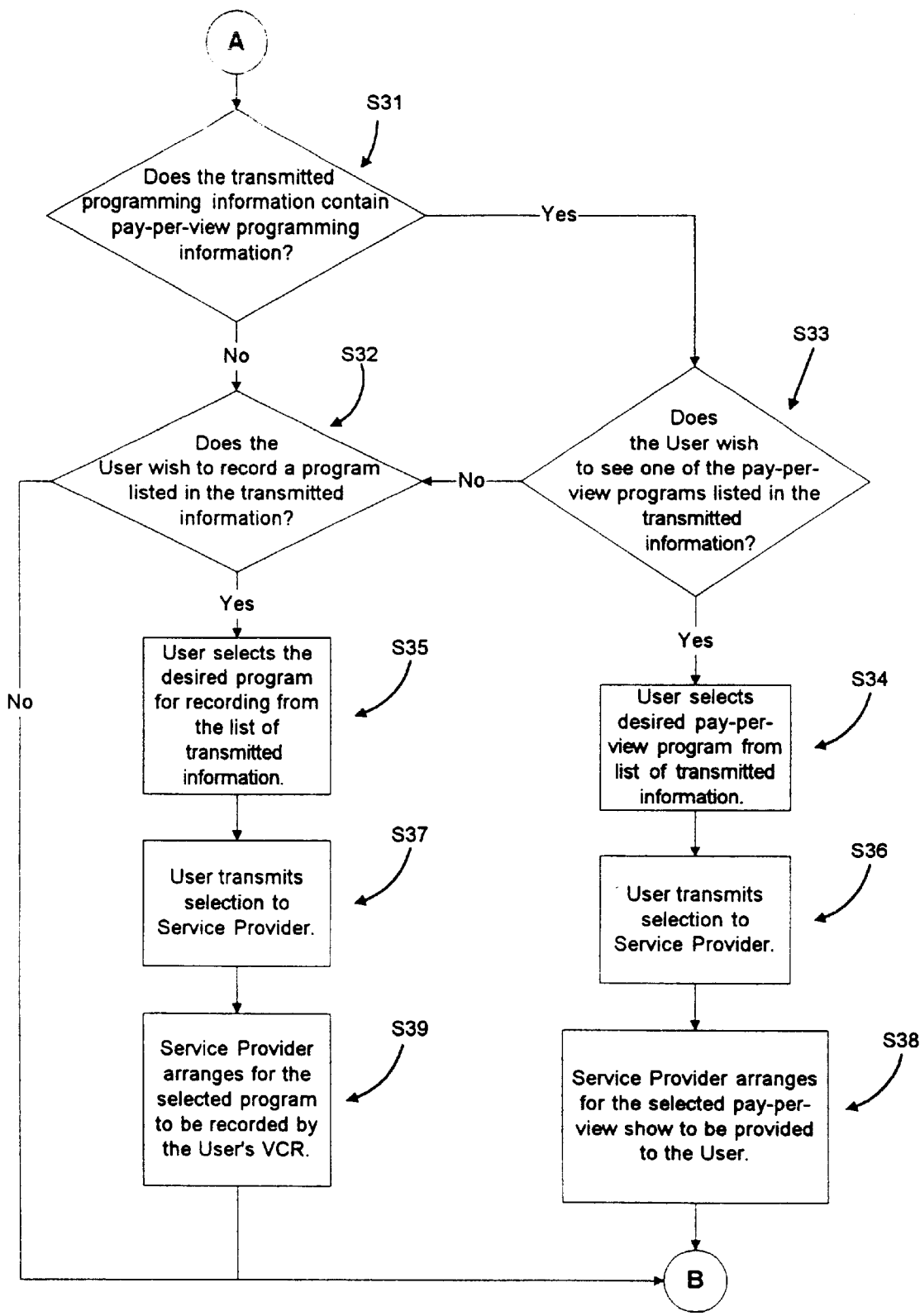
FIG. 3 is an additional flow chart illustrating some of the principles of the present invention.

FIG. 3 illustrates additional features of the present invention which are available if a two-way paging system is being used. After the service provider transmits the television programming information matching the user's profile in step S27 of FIG. 2, the transmission may contain information about available pay-per-view programming, step S31.

If the transmission does contain pay-per-view programming, at step S33, the user will decide whether or not or purchase the programming. If the user does wish to purchase the programming, in step S34, the user will select the desired program from the list of information transmitted. In step S36, the user transmits the selection to the service provider using the pager.

The pay-per-view programming is selected in the follow manner. A shown in FIG. 4, the display 44 of the user's pager lists the transmitted information regarding upcoming television programming. Similarly to selecting the icon 45 described above, if the user sees a pay-per-view (PPV) listing that he or she desires to purchase, the user will use buttons 43 to move a cursor on the display 44 to highlight the listing for the desired program. The user then press the select button 42 to transmit the selection of the pay-per-view program to the service provider.

Returning to FIG. 3, after the user transmits a selected pay-per-view program in step S36, the service provider receives the user's transmitted selection and automatically arranges with the cable company to have the pay-per-view program provided for the user. The service provider may then bill the user on behalf of the cable company.

If there is no pay-per-view programming listed in the information transmitted by the service provider, or if the user does not wish to purchase any of the pay-per-view programming listed, the process moves to step S32 in FIG. 3. In step S32, the user considers whether there is a program listed in the transmitted information which he or she wishes to record using, for example, his or her video cassette recorder ("VCR"). If there is no such programming listed, the user takes no action and the process returns to step S23 of FIG. 23 in which the service provider continues to monitor available programming for programs of interest to the user.

If there is a program the user wishes to have recorded, then, in step S35 of FIG. 3, the user highlights and selects the program to be recorded from the listing of transmitted information. The selection is accomplished in the same manner previously described for selecting pay-per-view programming.

In step S37, the user transmits the selection of the program to be recorded to the service provider. In step S39, the service provider arranges for the user's VCR to record the selected program. The process then returns to step S23 of FIG. 23 in which the service provider continues to monitor available programming for programs of interest to the user.

Figure 5:
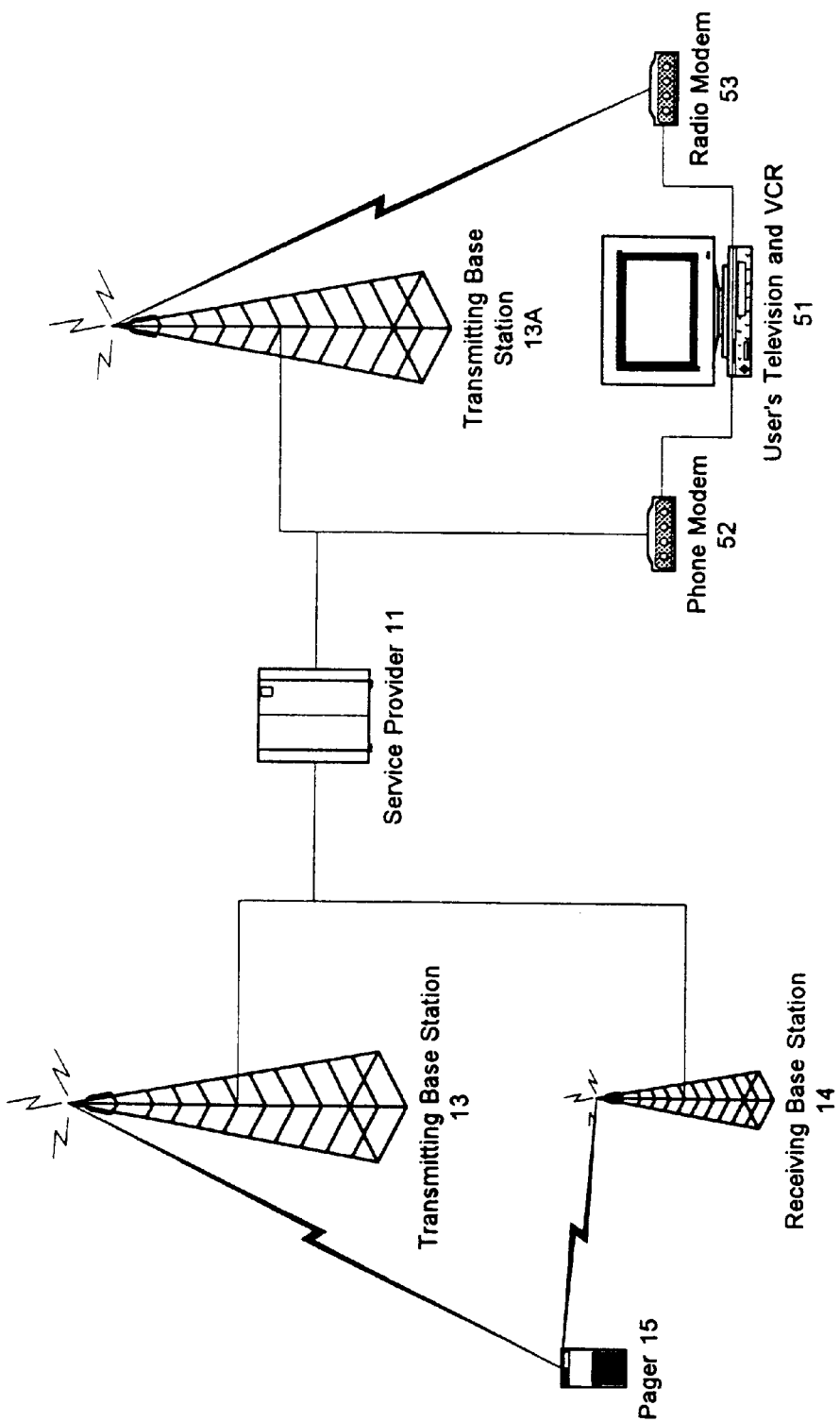
FIG. 5 is a diagram of a paging system integrated with a user's television and VCR according to the present invention.

FIG. 5 illustrates how, in step S39, the service provider arranges for the user's VCR to record a selected program. The service provider 11 transmits the compiled television programming information of interest to the user from transmitting base station 13. The user receives the information using pager 15. The user then selects a program to be recorded and transmits the selection to the paging system via receiving base station 14.

The service provider 11 receives the selection and then programs the user's VCR 51 to record the selected program at the appropriate time and channel. The service provider 11 may access and program the user's VCR 51 in one of two ways (both of which are illustrated in FIG. 5).

The service provider may use a phone line to connect to phone modem 52 at the pager user's residence. The modem 52 must also have a connection to the user's VCR 51. Using the connection to the user's VCR 51 via phone modem 52, the service provider 11 then programs the user's VCR 51 to record the selected program.

In the alternative, the user's VCR 51 may be provided with a radio modem 53 which operates on the paging system of the service provider 11. The service provider 11, using transmitting base station 13A, radios the programming information to the user's VCR via radio modem 53. The VCR is then programmed to record the television program selected by the user. In either case, when the user returns, the program that the user may otherwise have missed will have been recorded by the user's VCR 51.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A system for providing and using television or radio programming information comprising:

means for remotely receiving a wireless transmission of television or radio programming information, said means having a display means for displaying said information thereon; and an information transmission system comprising:

at least one signal transmitting means for wirelessly transmitting signals containing said information to said means for receiving;

means for storing television or radio programming information;

means for extracting programming information from said means for storing and transmitting said information using said signal transmitting means.

2. A system as claimed in claim 1, further comprising:

means for storing an interest profile that describes what programming information or what type of programming information a user of said means for receiving desires to receive; and means for sorting said programming information to compile information which matches said interest profile.

3. A system as claimed in claim 1, wherein said means for receiving further comprises:

means for inputting television program selection information based on said received programming information; and means for transmitting said television program selection information.

4. A system for providing and using television or radio programming information comprising:

at least one radio signal transmitting base station for transmitting radio signals containing said information to a pager for receiving and displaying said information;

a database of said television or radio programming information;

a processor connected to said database and to said at least one base station for extracting programming information from said database and transmitting said information to said pager.

5. A system as claimed in claim 4, further comprising:

a profile database connected to said processor of said paging system containing an interest profile that describes what programming information or what type of programming information a user of said pager desires to receive;

wherein said processor sorts said information in said database of programming information to compile information which matches said interest profile, and transmits said compiled information to said pager.

6. A system as claimed in claim 4, further comprising said pager wherein said pager comprises:

a user input device for inputting television program selection information based on said television programming information; and a transmitter for transmitting said television program selection information to said paging system.

7. A system as claimed in claim 6, wherein:

said television program selection information comprises a selected pay-per-view program; and said paging system comprises means for purchasing said selected pay-per-view program for a pager user.

8. A system as claimed in claim 6, wherein:

said television program selection information comprises a selected program to be recorded; and said paging system comprises means for arranging for said selected program to be recorded for a pager user.

9. A system as claimed in claim 8, wherein said means for arranging for said selected program to be recorded for a pager user comprises a phone modem, accessible by said paging system, through which a video recorder belonging to said pager user may be programmed.

10. A system as claimed in claim 8, wherein said means for arranging for said selected program to be recorded for a pager user comprises a radio modem, accessible by said paging system, through which a video recorder belonging to said pager user may be programmed.

* * * * *